Jan. 2, 1934.  S. RUBEN  1,941,493

LIGHT SENSITIVE CIRCUIT

Filed Dec. 6, 1929

INVENTOR
SAMUEL RUBEN
BY
ATTORNEY

Patented Jan. 2, 1934

1,941,493

UNITED STATES PATENT OFFICE 1,941,493

LIGHT SENSITIVE CIRCUIT

Samuel Ruben, New York, N. Y., assignor to Ruben Tube Company, Englewood, N. J., a corporation of Delaware Application December 6, 1929. Serial No. 412,077

2 Claims. (Cl. 250—41.5)

This invention relates to a light sensitive circuit.

An object of the invention is to provide a circuit arrangement for a light sensitive cell which provides improved operation thereof.

A specific object is to provide an improved circuit arrangement for photo-sensitive cells of the electrolytic photo-voltaic type whereby electrolytic effects are minimized.

Other objects and objects relating especially to the means and method of making and assembling the various parts and to their use in a circuit will be apparent as the description of the invention proceeds.

One embodiment of the invention has been illustrated in the accompanying drawing in which.

Figure 1:
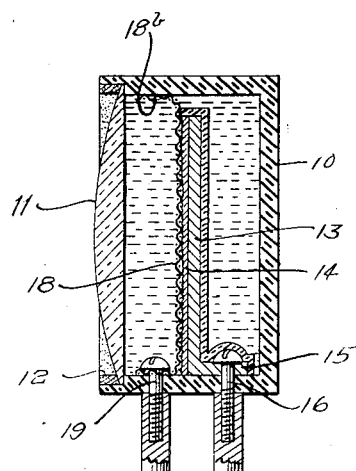
Fig. 1 is a sectional side elevation of a light sensitive cell constructed in accordance with the invention, shown more or less diagrammatically with a circuit for the operation thereof.
Figure 2:
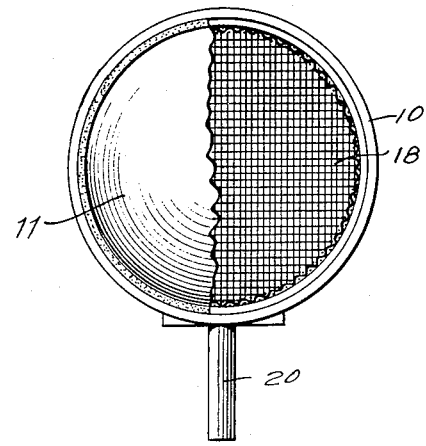
Fig. 2 is a front view, partially in section, of the cell shown in Fig. 1.
Figure 3:
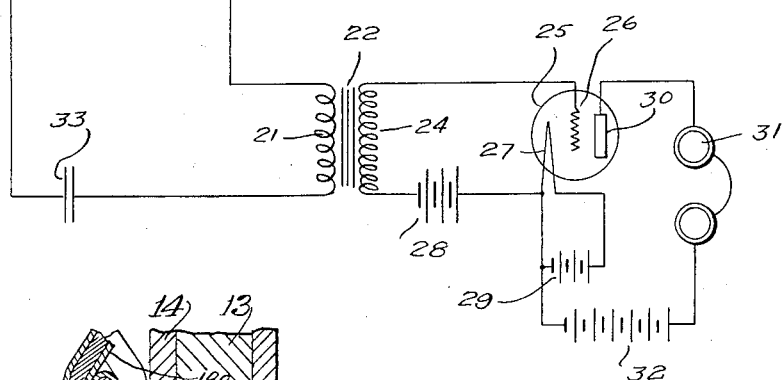
Fig. 3 is an enlarged sectional view of a portion of the inactive electrode.
Figure 3:
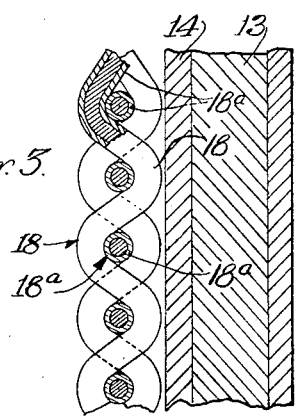

The embodiment of the invention as illustrated comprises a casing 10 of bakelite or other desired insulating material which is preferably made cylindrical and closed at the back as indicated, while the front is open to receive the glass 11 which may be made in the form of a lens, if desired, and secured in place by means of cement 12 applied around the circumference thereof. Inside of the casing 10 is mounted a disc 13 of copper having a light sensitive surface 14 spaced from the glass 11 and provided with a flange 15 at its lower edge by which it may be mounted upon the bakelite casing with a screw 16 which passes through an opening in the flange 15 and an opening in the bakelite casing 10 and is secured by a contact terminal 17 which is screwed upon the threaded end of the screw 16. A wire gauze electrode 18 preferably of copper and with a coating 18a of copper sulphide, selenide, or telluride, is preferably made in the form of a disc and positioned in as close contact to the light-sensitive surface 14 as possible. The gauze electrode 18 may be provided with a flange 18b extending around its periphery, if desired, to aid in holding it in place within the casing 10, and a screw 19 may be provided for securing it against the casing 10 and also serving as a means of attaching it to the terminal 20 which is screwed upon the threaded end of the screw 19. The terminals 17 and 20 form the contact terminals for making the electrical connections to the cell. The gauze electrode 18 may be spaced to one side of the light-sensitive electrode, if desired, or even in back of it, although best results are accomplished by positioning it as indicated.

The container 10 is filled with a slightly acidified transparent electrolyte of suitable character.

The light-sensitive surface 14 on the disc 13 is preferably cuprous oxide, thermally and integrally formed from a copper base, and subsequently etched. After the etching is completed, the unused side of the photo-sensitive electrode is coated with an opaque insulating varnish 13a such as asphaltum base varnish and care should be taken to cover all of the metallic parts not light-sensitive, including the screw 16 and flange 15 to prevent local circuits being set up between uncovered parts and the cuprous oxide surface which would cut down the life of the cell.

In Fig. 1 the light-sensitive cell as described above is shown connected in a circuit with the contact terminals 17 and 20 connected in series with the primary winding 21 of a transformer 22. The secondary 24 of the transformer 22 may be connected across the input of an amplifier circuit comprising an amplifier tube 25 having a grid 26 connected to one side of the secondary 24 and a cathode 27 connected to the other side through a battery 28 to maintain a definite potential on the grid 26. A battery 29 is provided to energize the cathode 27, and the output from the plate 30 is connected through a translating device 31 such as a telephone receiver or loud speaker in series with a B battery 32 to provide a plate supply or electron accelerating force of potential. While such an amplifier is shown and described it is apparent that any type of amplifier may be used for this purpose or a series of amplifiers may be used where large volumes of sound are described.

In order to counteract the electrolytic action and effect of the slightly acid electrolyte, it is essential to connect the amplifier with a capacitance connection so as to prevent static or dark current flow, the latter being a limiting factor in obtaining long life with cells of this type, as the cuprous oxide is reduced to copper by the hydrogen obtained by electrolysis. A condenser 33, is therefore inserted in the circuit containing the contact terminals 17 and 20 of the light-sensitive cell. When this condenser is made relatively large, only the dynamic component of the cell output is discharged through the circuit and electrolytic effects are eliminated.

The effect of a varying beam of light on the oxide surface is to cause a varying potential across the cell terminals. This variation is due to the following changes under the influence of light, to wit:

(1) Change of contact potential of cuprous oxide and its surrounding electrolyte.

(2) Change of contact potential between the cuprous oxide and the copper base when some light is transmitted through the translucent cuprous oxide layer.

(3) Change of resistance of the cuprous oxide layer to its copper base which causes a change of external potential due to the variation of the internal resistance and changes of potential.

As will be apparent, to change the impedance and contact potential of the cell will induce potential variations in the transformer 22 and, therefore, potential variations on the grid of the amplifier tube which will be reproduced in the plate circuit at greater potential causing the sound to be emitted from the translating device 31.

While I have described the use of cuprous oxide as the light sensitive substance, other light sensitive materials may be used such as selenium, molybdenum sulphide, or thallium sulphide.

Organic acids are preferably employed to render the electrolyte conductive but other substances may be used.

The cell is adapted to be used under any condition where a variable light source is desired to be translated into electrical energy, such for example as talking moving pictures where light is transmitted through a sound wave recorded on the moving picture film. The cell is also applicable to television or wire transmission of photographs, facsimile reproduction, or in any other device governed by changes in the intensity of light.

While I have described one embodiment of the invention, many variations may be made without departing from the spirit thereof, and I do not desire to limit myself to what has been shown and described except as such limitations are included in the appended claims.

What I claim is:

1. In a circuit for translating light variations into electrical impulses, the combination of an electrolytic photo-voltaic cell, a capacitance and a load device, said capacitance being in series with said cell and said load device.

2. In an electrical circuit, the combination of an electrolytic photo voltaic cell of the copper-cuprous oxide type containing a slightly acidic electrolyte, an electric condenser and a translating device, said condenser being in series with said cell and said translating device.

SAMUEL RUBEN.